United States Patent
Takahashi

(10) Patent No.: US 9,188,209 B2
(45) Date of Patent: Nov. 17, 2015

(54) OPTICAL SCANNING DEVICE AND IMAGE FORMING APPARATUS

(71) Applicant: KYOCERA Document Solutions Inc., Osaka (JP)

(72) Inventor: Hiroki Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/314,126

(22) Filed: Jun. 25, 2014

(65) Prior Publication Data

US 2015/0002914 A1    Jan. 1, 2015

(30) Foreign Application Priority Data

Jun. 27, 2013   (JP) ................................ 2013-135070

(51) Int. Cl.
  *G03G 21/00*   (2006.01)
  *F16H 25/12*   (2006.01)
  *G03G 15/00*   (2006.01)

(52) U.S. Cl.
  CPC ................ *F16H 25/12* (2013.01); *G03G 15/00* (2013.01)

(58) Field of Classification Search
  CPC . G03G 15/0898; G03G 21/00; G03G 15/326; G03G 21/16; G03G 21/20; G03G 15/04027; G03G 21/10; G03G 21/0035; G03G 2215/00413; G03G 2215/00708; F16H 25/12
  See application file for complete search history.

(56) References Cited

U.S. PATENT DOCUMENTS

| | | | | |
|---|---|---|---|---|
| 5,617,195 A | * | 4/1997 | Torimaru et al. | 399/27 |
| 5,640,636 A | * | 6/1997 | Yokoyama et al. | 396/411 |
| 2006/0269322 A1 | * | 11/2006 | Tanaka | 399/128 |
| 2008/0107444 A1 | * | 5/2008 | Hashimoto | 399/99 |
| 2009/0148173 A1 | * | 6/2009 | Tajima | 399/36 |
| 2010/0000843 A1 | * | 1/2010 | Nishikawa et al. | 198/657 |
| 2011/0242265 A1 | * | 10/2011 | Takahashi et al. | 347/263 |
| 2011/0292151 A1 | * | 12/2011 | Takahashi | 347/118 |
| 2012/0105922 A1 | * | 5/2012 | Takahashi | 358/474 |
| 2014/0112676 A1 | * | 4/2014 | MORI, Masato | 399/49 |
| 2014/0119768 A1 | * | 5/2014 | YUKI, Uohashi | 399/98 |
| 2014/0334840 A1 | * | 11/2014 | Mizuno, Masahiko | 399/98 |
| 2014/0348529 A1 | * | 11/2014 | Takahashi et al. | 399/71 |

FOREIGN PATENT DOCUMENTS

| | | | | |
|---|---|---|---|---|
| JP | 11119631 A | * | 4/1999 | |
| JP | 2009-143108 A | | 7/2009 | |

* cited by examiner

*Primary Examiner* — Cheukfan Lee
(74) *Attorney, Agent, or Firm* — Studebaker & Brackett PC

(57) ABSTRACT

An optical scanning device includes a screw shaft, a holing member, a cleaning member, and a drive mechanism. The screw shaft is arranged along a covering. The screw shaft includes a main body portion and two rotary shaft portions provided on opposite ends of the main body portion integrally with the main body portion. A screw groove is formed in the main body portion. A protrusion engaging with the screw groove is formed on the holding member. Rotation of the screw shaft moves the holding member along the screw shaft. The cleaning member is held by the holding member. The drive mechanism drives and rotates the screw shaft, while moving the screw shaft in a direction reverse to a movement direction of the holding member.

6 Claims, 8 Drawing Sheets to the surface of the glass covering. When so, the optical characteristics of the optical scanning device may degrade. Degradation of the optical characteristics may cause an image defect. In view of this, the optical scanning device is generally provided with a cleaning mechanism to periodically clean the surface of the glass covering.

OPTICAL SCANNING DEVICE AND IMAGE FORMING APPARATUS

INCORPORATION BY REFERENCE

The present application claims priority under 35 U.S.C. §119 to Japanese Patent Application No. 2013-135070, filed Jun. 27, 2013. The contents of this application are incorporated herein by reference in their entirety.

BACKGROUND

The present disclosure relates to optical scanning devices and image forming apparatuses including an optical scanning device.

As image forming apparatuses, such as copiers, printers, etc. an image forming apparatus employing an electrographic process has been known. The electrographic image forming apparatus includes an optical scanning device and a developing device. The optical scanning device emits light for formation of an electrostatic latent image on a photoreceptor. The developing device develops the electrostatic latent image formed on the photoreceptor to make it a toner image.

The optical scanning device includes a casing to accommodate a polygon mirror, an imaging lens, etc. A light emitting port is formed in the casing to emit light. The light emitting port is blocked with a covering. The covering may be made from transparent glass covering, for example.

Incidentally, the surface of the glass covering may contaminate with toner and the like, or dust or the like may adhere to the surface of the glass covering. When so, the optical characteristics of the optical scanning device may degrade. Degradation of the optical characteristics may cause an image defect. In view of this, the optical scanning device is generally provided with a cleaning mechanism to periodically clean the surface of the glass covering.

A typical cleaning mechanism may include a screw shaft, a holding member, and a cleaning member. The screw shaft is arranged along the glass covering. The holding member is screw inserted in the screw shaft. The cleaning member is held by the holding member. A protrusion is formed on the inner peripheral surface of the holding member to engage with a screw groove of the screw shaft. Positive or reverse rotation of the screw shaft causes the cleaning member to reciprocate together with the holding member along the glass covering. Reciprocation of the cleaning member in this manner can clean the surface of the glass covering.

In order to appropriately control the movement of the cleaning member, a sensor may be provided to detect the position of the cleaning member. However, provision of the sensor may increase the cost. For this reason, a predetermined time period is set usually for movement of the cleaning member. When the predetermined movement time elapses, the moving direction of the cleaning member is reversed. In order not to leave a non-cleaned region of the glass covering, the movement time of the cleaning member is set longer usually.

Further, springs are provided on the opposite ends of the holding member of the cleaning mechanism in the axial direction of the screw shaft. When the movement direction of the cleaning member is changed by reverse rotation of the screw shaft, the compression force of one of the springs pushes back the holding member to allow the protrusion of the holding member to engage with the screw groove of the screw shaft.

SUMMARY

A optical scanning device according to the present disclosure includes a casing, a covering configured to transmit light, a screw shaft, two bearings, a holding member, a cleaning member, and a drive mechanism. A light emitting port is formed in the casing. The covering blocks the light emitting port. The screw shaft is arranged along the covering. Further, the screw shaft includes a main body portion and two rotary shaft portions provided on opposite ends of the main body portion integrally with the main body portion. A screw groove is formed in the main body portion. Each rotary shaft portion has an outer peripheral surface continuing to a bottom surface of the screw groove in the main body portion. The two bearings are provided at the casing and configured to support the respective rotary shaft portions rotatably. The two bearings also support the respective rotary shaft portions movably in the axial direction of the screw shaft. A protrusion engaging with the screw groove is formed on the holding member. Rotation of the screw shaft moves the holding member along the screw shaft. The cleaning member is held by the holding member and is configured to clean a surface of the covering by movement of the holding member. The drive mechanism is configured to drive and rotate the screw shaft and to move the screw shaft in a direction reverse to a movement direction of the holding member.

Besides, an image forming apparatus according to the present disclosure forms an image corresponding to an electrostatic latent image on a sheet. The image forming apparatus includes the above optical scanning device and an image forming section. The image forming section includes a photoreceptor on which the electrostatic latent image is formed by being irradiated with light emitted from the optical scanning device.

DETAILED DESCRIPTION

An embodiment of the present disclosure will be described in detail below with reference to the accompanying drawings. It is noted that the present disclosure is not limited to the following embodiment.

<Image Forming Apparatus>

Figure 1:
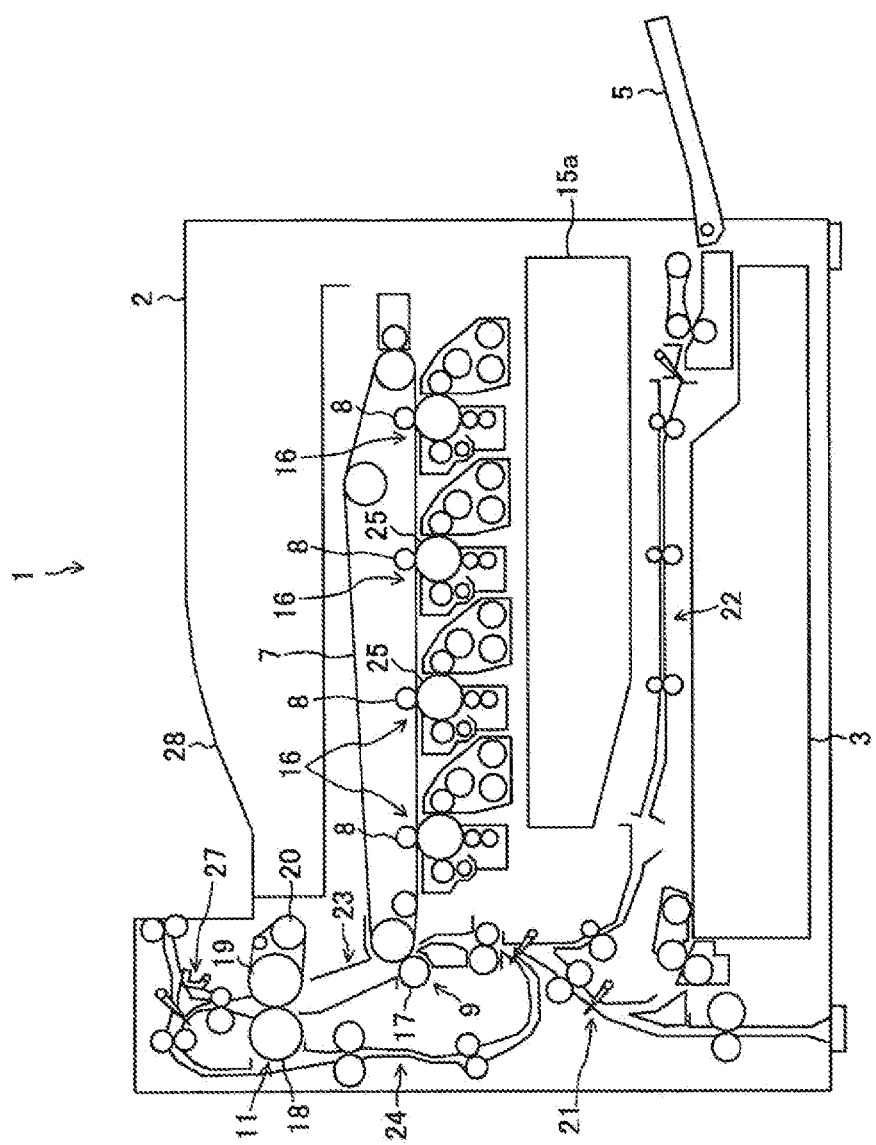
FIG. 1 is a cross sectional view showing a schematic configuration of an image forming apparatus according to one embodiment.

FIG. 1 is a cross sectional view showing a schematic configuration of an image forming apparatus 1. The image forming apparatus 1 is a tandem type color printer. As shown in FIG. 1, the image forming apparatus 1 includes an intermediate transfer belt 7, a plurality of primary transfer sections 8, a secondary transfer section 9, a fixing device 11, an optical scanning unit 15a, and a plurality of image forming sections 16.

A sheet feed cassette 3 is arranged in the lower part of a main body 2 of the image forming apparatus 1. A sheet before being printed is loaded inside the sheet feed cassette 3. The sheet may be paper, for example. A first sheet conveyance section 21 is provided on one side of the sheet feed cassette 3. The first sheet conveyance section 21 receives the sheet sent out from the sheet feed cassette 3 and conveys it upward to the secondary transfer section 9.

A manual sheet feed section 5 is provided on the right side of the sheet feed cassette 3. A second sheet conveyance section 22 is provided on the left side of the manual sheet feed cassette 5. The second sheet conveyance section 22 receives a sheet sent out from the manual sheet feed section 5 and conveys it to the first sheet conveyance section 21.

The optical scanning unit 15a includes a plurality of optical scanning devices 15 (see FIG. 2) arranged side by side above the second sheet conveyance section 22. In the present embodiment, the optical scanning unit 15a includes four optical scanning devices 15. Each optical scanning device 15 irradiates laser light to the corresponding image forming section 16 on the basis of image data that the image forming apparatus 1 receives. In the present embodiment, the image forming apparatus 1 includes four image forming sections 16. The four image forming sections 16 are provided above the optical scanning unit 15a. The intermediate transfer belt 7, which is endless, is provided above the four image forming sections 16. The intermediate transfer belt 7 is wound to a plurality of rollers. The intermediate transfer belt 7 is driven and rotated by a driving device.

The four image forming sections 16 are arranged in a line along the intermediate transfer belt 7, as shown in FIG. 1. The four image forming sections 16 form toner images in respective colors of yellow, magenta, cyan, and black. That is, each image forming section 16 includes a photosensitive drum 25. The photosensitive drum 25 is irradiated with laser light from the corresponding optical scanning device 15. Irradiation of the laser light from the respective optical scanning devices 15 forms electrostatic latent images of an original image on the respective photosensitive drums 25. Development of the electrostatic latent images by the respective image forming sections 16 forms toner images in the respective colors.

The primary transfer sections 8 are arranged above the image forming sections 16 correspondingly. In other words, the number of the primary transfer sections 8 is four. Each primary transfer section 8 includes a transfer roller. The transfer roller primarily transfers the toner image formed by the corresponding image forming section 16 on the surface of the intermediate transfer belt 7.

When the intermediate transfer belt 7 is driven and rotated, the toner images formed by the respective image forming sections 16 are transferred to the intermediate transfer belt 7 with predetermined timing. In this manner, a color toner image is formed on the surface of the intermediate transfer belt 7. The color toner image is a toner image formed by overlying the toner images in the four colors of yellow, magenta, cyan, and black.

As shown in FIG. 1, the secondary transfer section 9 includes a transfer roller 17 arranged on the left side of the intermediate transfer belt 7. The secondary transfer section 9 applies transfer bias voltage having a polarity reverse to that of the toner to the sheet sent from the first sheet conveyance section 21 through the transfer roller 17. Thus, the color toner image is transferred to the sheet from the intermediate transfer belt 7 (secondary transfer).

The fixing device 11 is provided above the secondary transfer section 9. A third sheet conveyance section 23 is formed between the secondary transfer section 9 and the fixing device 11. The third sheet conveyance section 23 conveys to the fixing device 11 the sheet to which the color toner image is secondarily transferred. The fixing device 11 includes a pressure roller 18, a fixing roller 19, and a heating roller 20. The fixing device 11 applies heat and pressure to the sheet conveyed from the third sheet conveyance section 23. Thus, the color toner image is fixed to the sheet.

A branch portion 27 is provided above the fixing device 11. For simplex printing, the sheet ejected from the fixing device 11 is ejected from the branch portion 27 to a sheet ejection section 28. The sheet ejection section 28 is formed in the upper part of the image forming apparatus 1. In duplex printing, the sheet is conveyed again to the secondary transfer section 9 from the branch portion 27 through a fourth sheet conveyance section 24.

<Optical Scanning Device>

Figure 2:
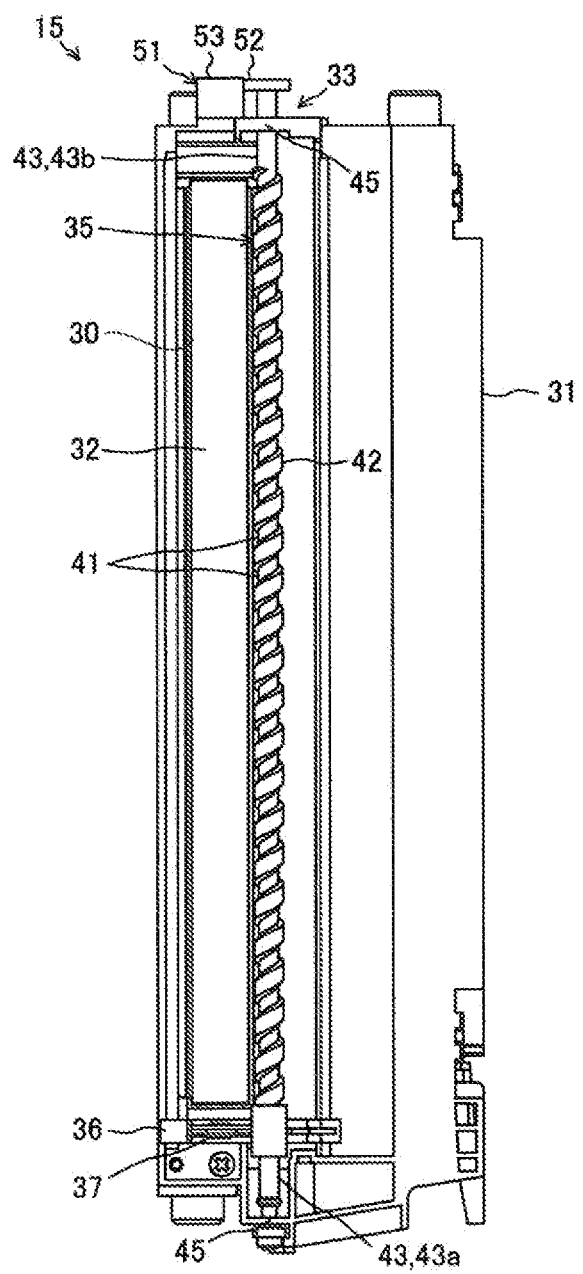
FIG. 2 is a plan view showing the outer appearance of an optical scanning device according to the embodiment.
Figure 3:
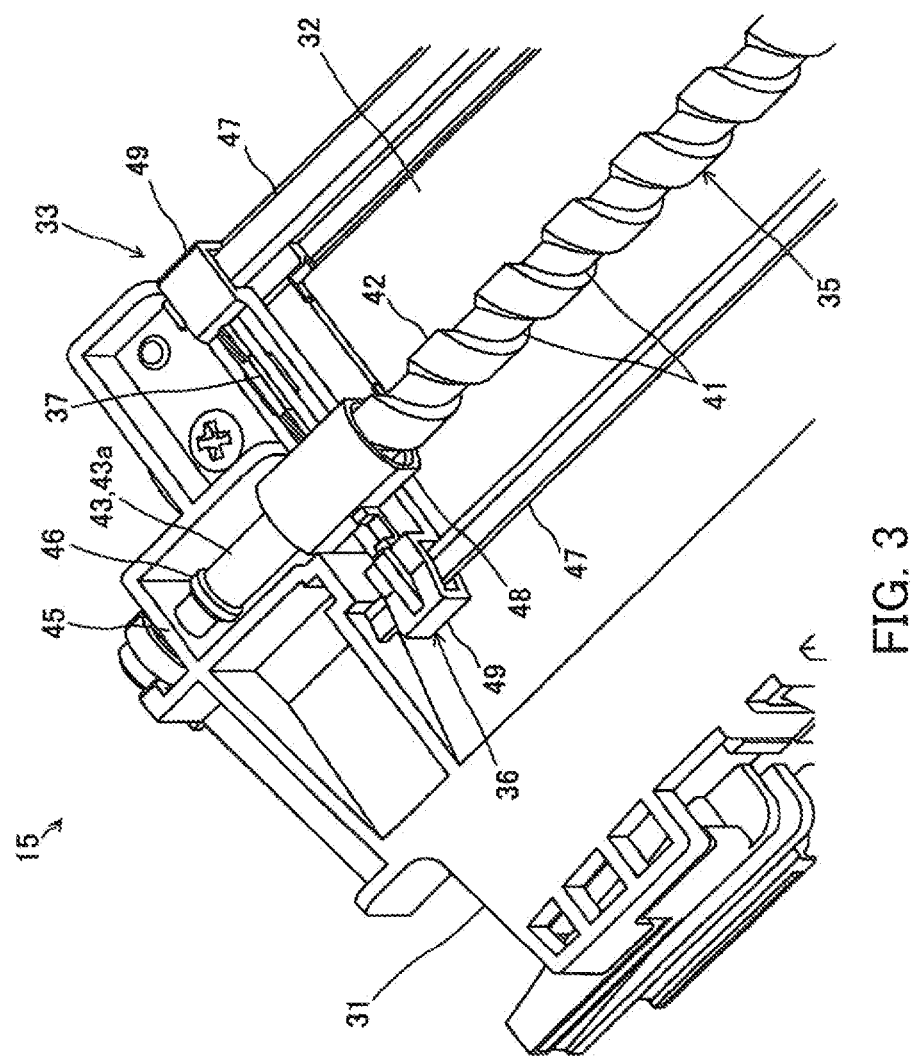
FIG. 3 is a perspective view showing the outer appearance of a cleaning mechanism according to the embodiment.

FIG. 2 shows the outer appearance of one of the optical scanning devices 15. FIG. 3 shows the outer appearance of the cleaning mechanism 33. FIGS. 4-8 schematically show an operation of the cleaning mechanism 33.

As shown in FIG. 2, each optical scanning device 15 includes a casing 31, a glass covering 32 to transmit the laser light, and the cleaning mechanism 33. In the casing 31, a light emitting port 30 is formed for the laser light. The glass covering 32 blocks the light emitting port 30. The cleaning mechanism 33 cleans the glass covering 32.

The casing 31 accommodates a light source, a polygon mirror, an imaging lens, etc. The light source includes a laser diode or the like. The polygon mirror and the imaging lens deflect the laser light emitted from the light source. The casing 31 is made from a resin material, for example.

The light emitting port 30 and the glass covering 32 are formed into thin and long rectangular shapes. Specifically, the light emitting port 30 and the glass covering 32 extend in the main scanning direction (vertical direction in FIG. 2) of the laser light emitted to the corresponding photosensitive drum 25.

The cleaning mechanism 33 includes a screw shaft 35, a holding member 36, and a cleaning pad 37. The screw shaft 35 is arranged along the glass covering 32. The holding member 36 is screw inserted in the screw shaft 35. The cleaning pad 37 is held by the holding member 36.

The screw shaft 35 includes a main body portion 42 and two rotary shaft portions 43 (43a and 43b). A screw groove 41 is formed in the main body portion 42. The rotary shaft portions 43 are provided on the opposite ends of the main body portion 42 integrally with the main body portion 42. Each rotary shaft portion 43 has a cylindrical outer peripheral surface. The outer peripheral surface smoothly continues to the bottom surface of the screw groove 41 of the main body portion 42. Further, a stopper 46 is formed at each rotary shaft portion 43. The stopper 46 is arranged apart from the main body portion 42 with a predetermined space left.

Two bearings 45 are provided in the casing 31. Each bearing 45 supports the corresponding rotary shaft portion 43 of the screw shaft 35 rotatably. Further, each bearing 45 supports the corresponding rotary shaft portion 43 of the screw shaft 35 movably in the axial direction of the screw shaft 35. In addition, a pair of rails 47 is formed in the casing 31. The pair of rails 47 is arranged to interpose the glass covering 32. The rails 47 extend in parallel along the glass covering 32.

Figure 5:
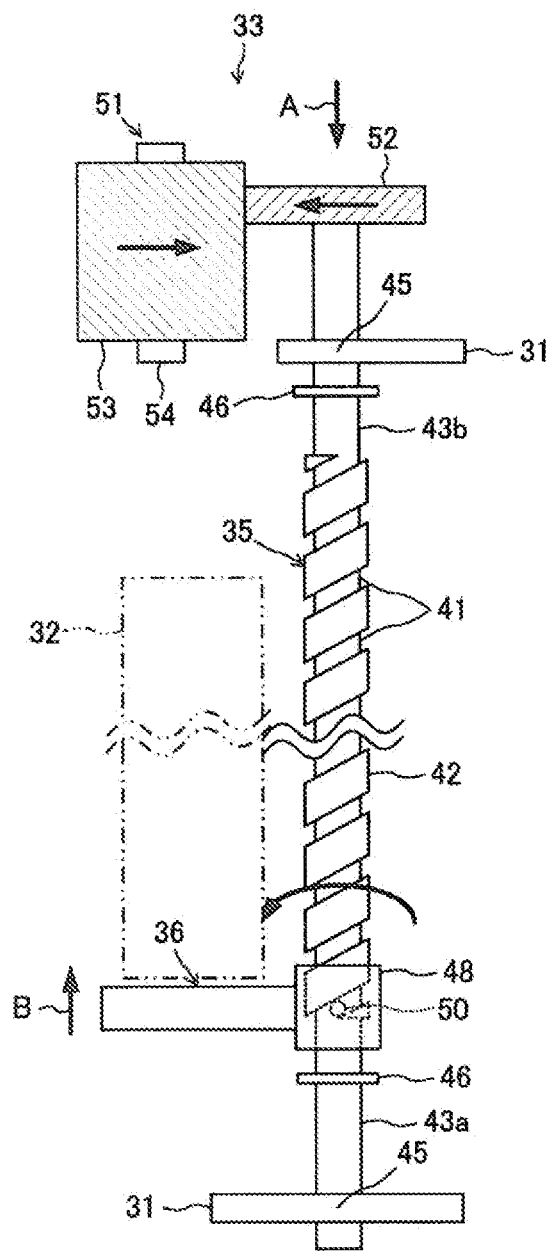
FIG. 5 is a plan view schematically showing a state in which a protrusion of a holding member engages with a screw groove according to the embodiment.

The holding member 36 includes a cylindrical insertion portion 48 and two engaging portions 49. The screw shaft 35 is screw inserted in the insertion portion 48. The engaging portions 49 engage with the rails 47. A protrusion 50 is formed on the inner wall of the insertion portion 48, as shown in FIG. 5, for example. The protrusion 50 engages with the screw groove 41. Rotation of the screw shaft 35 causes the screw groove 41 to guide the protrusion 50 and causes the rails 47 to guide the engaging portions 49. Thus, the holding member 36 moves along the screw shaft 35.

The cleaning pad 37 includes a blade member in contact with the glass covering 32. The blade member is made from an elastic resin material, for example. Movement of the cleaning pad 37 together with the holding member 36 on the glass covering 32 causes the blade member to slide on the surface of the glass covering 32. In this manner, the surface of the glass covering 32 is cleaned.

Each optical scanning device 15 further includes a drive mechanism 51. The drive mechanism 51 rotates the screw shaft 35, while moving the screw shaft 35 in a direction reverse to the movement direction of the holding member 36. That is, the screw shaft 35 is not only rotated but also moved in its axial direction in association with the rotation.

The drive mechanism 51 includes a first helical gear 52 and a second helical gear 53. The first helical gear 52 is connected to the screw shaft 35. The second helical gear 53 meshes with the first helical gear 52. The second helical gear 53 is connected to a drive shaft 54 to which drive power of a drive motor is transmitted. Further, the first and second helical gears 52 and 53 each have a helix angle of 45 degrees.

Rotation of the second helical gear 53 drives and rotates the first helical gear 52 to rotate the screw shaft 35 together with the first helical gear 52 and to move the screw shaft 35 in its axial direction.

The drive mechanism 51 is driven every time the number of sheets on which an image is formed by the image forming apparatus 1 reaches a predetermined number (e.g., 500). In driving, the drive mechanism 51 rotates the screw shaft 35 in the positive direction for a predetermined time period T and then rotates it in the reverse direction for the predetermined time period T. The time period T is set longer than a time period required for the cleaning pad 37 to move from one end to the other end of the glass covering 32. This can allow the cleaning pad 37 to reliably clean the entire glass covering 32.

An operation of the drive mechanism 51 will be described next.

Figure 4:
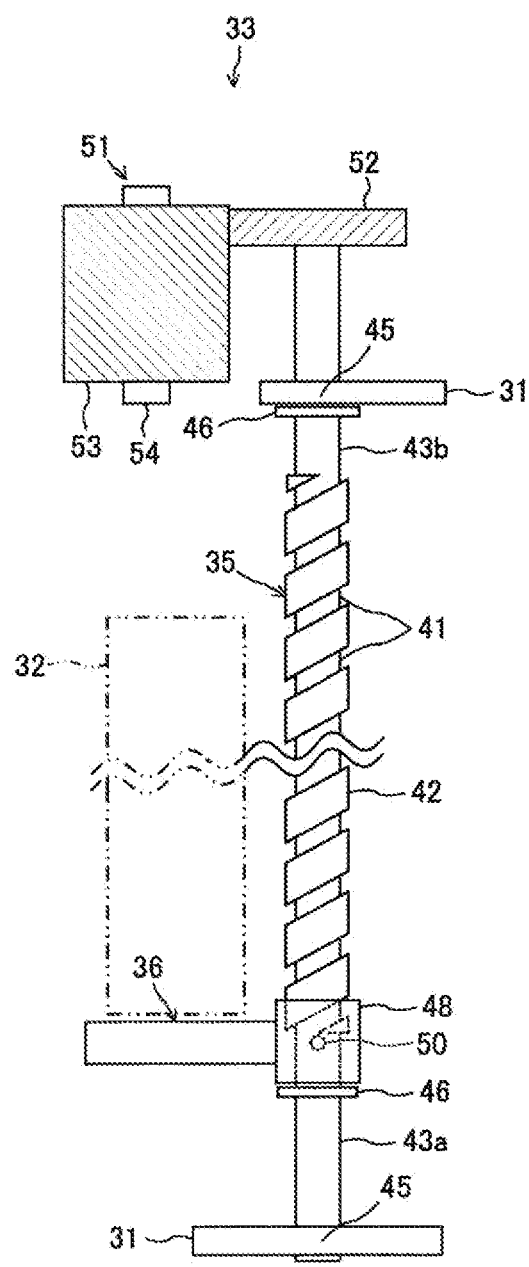
FIG. 4 is a plan view schematically showing a state in which a cleaning pad moves to a home position according to the embodiment.

As shown in FIG. 4, in normal time when the drive mechanism 51 does not operate, the cleaning pad 37 and the holding member 36 first wait at their home position separate from one end of the glass covering 32 (below in FIG. 4). The cleaning pad 37 at the home position does not overlap the glass covering 32. Further, the protrusion 50 of the holding member 36 is in contact with the outer peripheral surface of one 43a of the rotary shaft portions 43 of the screw shaft 35. In other words, the protrusion 50 is located outside the screw groove 41.

When the number of sheets on which an image is formed by the image forming apparatus 1 reaches the predetermined number, the drive mechanism 51 starts operating. In other words, the second helical gear 53 rotates to drive and rotate the first helical gear 52 together with the screw shaft 35. As shown in FIG. 5, the positive rotation of the first helical gear 52 and the screw shaft 35 moves the screw shaft 35 in the direction indicated by the arrow A to allow the screw groove 41 to receive the protrusion 50 of the holding member 36.

When the screw shaft 35 is rotated in the positive direction, the protrusion 50 engaging with the screw groove 41 is guided by the screw groove 41, while the holding member 36 is guided by the pair of rails 47. Thus, the holding member 36 moves together with the cleaning pad 37 along the glass covering 32 in the direction indicated by the arrow B reverse to the direction indicated by the arrow A.

Figure 6:
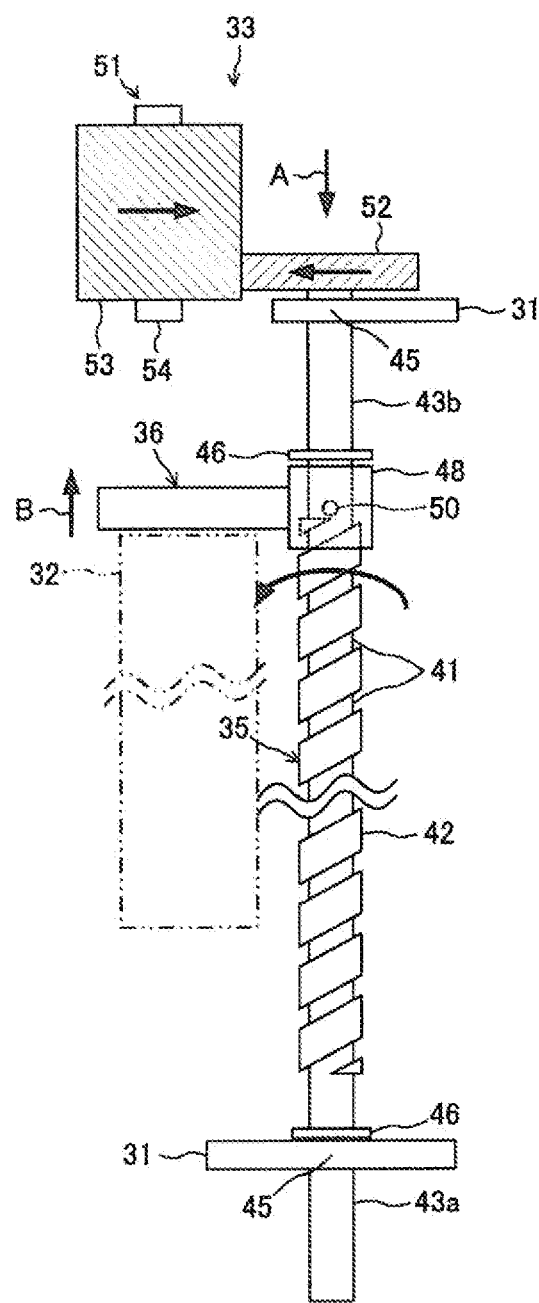
FIG. 6 is a plan view schematically showing a state in which the holding member moves from one end to the other end of a glass covering according to the embodiment.

As shown in FIG. 6, when the cleaning pad 37 moves from the one end to the other end of the glass covering 32, the protrusion 50 comes off from the screw groove 41 and moves onto the outer peripheral surface of the other rotary shaft portion 43b. Thus, the movement of the holding member 36 in the direction indicated by the arrow B terminates. Thereafter, the protrusion 50 slides on the outer peripheral surface of the rotary shaft portion 43b at a fixed location. In this manner, the clean pad 37 cleans the entire surface of the glass covering 32.

Figure 7:
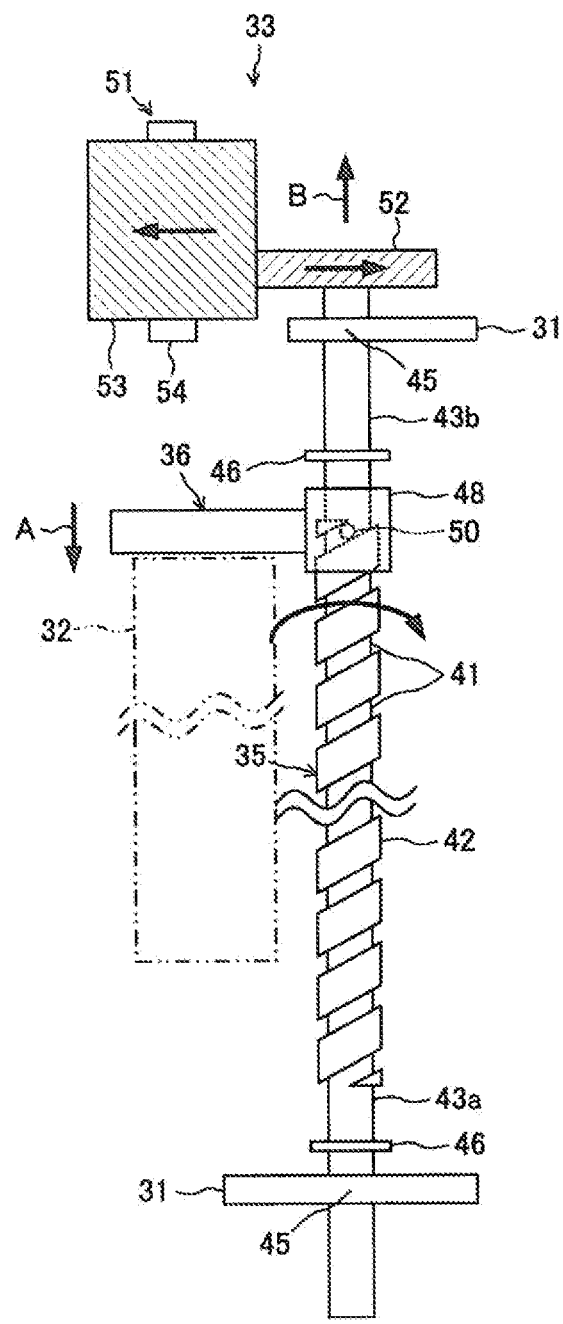
FIG. 7 is a plan view schematically showing a state in which the protrusion of the holding member engages with the screw groove according to the embodiment.

When the predetermined time period T elapses from the start of the positive rotation of the screw shaft 35, the first and second helical gears 52 and 53 rotate in the reverse direction. In other words, the first helical gear 52 and the screw shaft 35 are rotated in the reverse direction, so that the screw shaft 35 moves in the direction indicated by the arrow B, as shown in FIG. 7, thereby causing the main body portion 42 to approach the protrusion 50 on the rotary shaft portion 43. Thus, the screw groove 41 receives the protrusion 50 of the holding member 36.

When the screw shaft 35 is further rotated in the reverse direction, the protrusion 50 engaging with the screw groove 41 is guided by the screw groove 41, while the holding member 36 is guided by the pair of rails 47. Thus, the holding member 36 moves together with the cleaning pad 37 along the glass covering 32 in the direction indicated by the arrow A.

Figure 8:
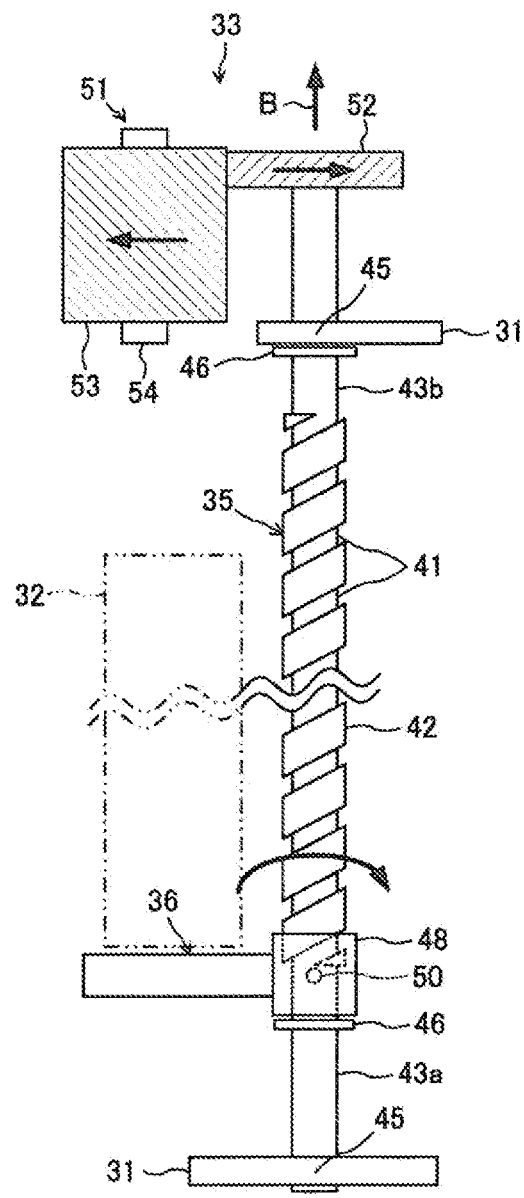
FIG. 8 is a plan view schematically showing a state in which the holding member moves from the other end to the one end of the glass covering according to the embodiment.

As shown in FIG. 8, when the cleaning pad 37 moves from the other end to the one end of the glass covering 32, the protrusion 50 comes off from the screw groove 41. In this manner, the clean pad 37 cleans the entire surface of the glass covering 32. Then, the cleaning pad 37 and the holding member 36 return to their home position.

When the predetermined time period T elapses from the start of the reverse rotation of the screw shaft 35, the first and second helical gears 52 and 53 stop rotating. Thus, a series of the cleaning operation by the drive mechanism 51 finishes.

According to the present embodiment, when the direction of rotation of the screw shaft 35 is reversed, the screw shaft 35 moves to allow the screw groove 41 to receive the protrusion 50. Thus, the protrusion 50 can engage with the screw groove 41. Accordingly, any member to bias the holding member 36 toward the main body portion 42 from the rotary shaft portions 43, for example, springs can be dispensed with. Further, the holding member 36 receives no external force toward the main body portion 42 from the rotary shaft portions 43. This can prevent collision of the protrusion 50 with a protruding part that defines the screw groove 41 when the cleaning pad 37 moves from the one end to the other end of the glass covering 32 in the direction indicated by the arrow B, as shown in FIG. 6. Accordingly, no noise may be generated which might be caused by collision of the protrusion 50 of the holding member 36 with the main body portion 42. In other words, according to the present embodiment, reduction can be achieved in both component cost and noise in cleaning the glass covering 32. Further, according to the present embodiment, the first and second helical gears 52 and 53 rotate the screw shaft 35, while moving the screw shaft 35 in the direction reverse to the movement direction of the holding member 36. Accordingly, the drive mechanism to move the screw shaft 35 can be simplified.

It should be noted that the color printer of tandem type is explained as one example of the image forming apparatus in the above embodiment, which however, should not be taken to limit the present disclosure. The image forming apparatus may be a monochrome printer. Alternatively, the image forming apparatus may be another image forming apparatus such as a copier, a scanner, a multifunction peripheral, etc. In addition, the optical scanning devices 15 are provided correspondingly to the colors in the above embodiment, which however, should not be taken to limit the present disclosure. The present disclosure may be applicable to a configuration in which light is irradiated to the four photosensitive drums 25 from one or two optical scanning devices.

What is claimed is:

1. An optical scanning device comprising:
   a casing in which a light emitting port is formed;
   a covering configured to block the light emitting port and to transmit light;
   a screw shaft arranged along the covering and including a main body portion and two rotary shaft portions provided on opposite ends of the main body portion integrally with the main body portion, a screw groove being formed in the main body portion, and each of the rotary shaft portions having an outer peripheral surface continuing to a bottom surface of the screw groove in the main body portion;
   two bearings provided at the casing and configured to support the rotary shaft portions rotatably and support the rotary shaft portions moveably in an axial direction of the screw shaft;
   a holding member on which a protrusion engaging with the screw groove is formed, the holding member being configured to move along the screw shaft by rotation of the screw shaft;
   a cleaning member held by the holding member and configured to clean a surface of the covering by movement of the holding member; and
   a drive mechanism configured to drive and rotate the screw shaft and to move the screw shaft in a direction reverse to a movement direction of the holding member, wherein
   the protrusion is located on the outer peripheral surface of one of the two rotary shaft portions and comes off from the screw groove before the drive mechanism starts driving the screw shaft,
   when the drive mechanism starts driving the screw shaft to rotate the screw shaft in a first rotation direction, the screw shaft moves in a first direction in which the screw groove receives the protrusion to cause the protrusion to engage with the screw groove before the holding member starts moving, and
   when the drive mechanism further rotates the screw shaft in the first rotation direction after engagement of the protrusion with the screw groove, the screw shaft further moves in the first direction and the protrusion is guided by the screw groove to move the holding member in a second direction reverse to the first direction.

2. An optical scanning device according to claim 1, wherein
   the drive mechanism includes:
      a drive shaft to which drive power is transmitted;
      a first helical gear connected to the screw shaft; and
      a second helical gear connected to the drive shaft and meshing with the first helical gear.

3. An image forming apparatus that forms an image corresponding to an electrostatic latent image on a sheet, comprising:
   an optical scanning device according to claim 1; and
   an image forming section including a photoreceptor on which the electrostatic latent image is formed by being irradiated with light emitted from the optical scanning device.

4. An optical scanning device according to claim 1, wherein
   the drive mechanism rotates the screw shaft in the first rotation direction for a predetermined time period set longer than a time period required for the cleaning member to move from one of ends to the other of the ends of the covering in the axial direction of the screw shaft, and
   the protrusion moves from the outer peripheral surface of the one of the two rotary shaft portions onto the outer peripheral surface of the other of the two rotary shaft portions during the predetermined time period, and then comes off from the screw groove.

5. An optical scanning device according to claim 4, wherein
   after rotating the screw shaft in the first rotation direction for the predetermined time period, the drive mechanism further rotates the screw shaft in a second rotation direction reverse to the first rotation direction for the predetermined time period, and
   the protrusion moves from the outer peripheral surface of the other of the two rotary shaft portions onto the outer peripheral surface of the one of the two rotary shaft portions during the predetermined time period for which the drive mechanism rotates the screw shaft in the second rotation direction, and then comes off from the screw groove.

6. An optical scanning device according to claim 1, wherein
   the protrusion has a columnar shape.

* * * * *